July 28, 1970 R. P. SIMMONS ET AL 3,522,111

METHOD OF MAKING A COMPOSITE METAL PRODUCT

Filed Oct. 24, 1967

INVENTORS
RICHARD P. SIMMONS
JOHN E. FOGARTY
HENRY O. MATTES
LORIN J. DAVIS

BY Ward, Haselton, McElhannon,
Brooks & Fitzpatrick

ATTORNEYS

United States Patent Office 3,522,111
Patented July 28, 1970

3,522,111
METHOD OF MAKING A COMPOSITE METAL PRODUCT
Richard P. Simmons, North Canton, and John E. Fogarty, Henry O. Mattes, and Lorin J. Davis, Canton, Ohio, assignors to Republic Steel Corporation, Cleveland, Ohio, a corporation of New Jersey
Filed Oct. 24, 1967, Ser. No. 677,637
Int. Cl. C21d 1/00, 9/42
U.S. Cl. 148—12.4                    10 Claims

ABSTRACT OF THE DISCLOSURE

Composite metal articles composed of plates of hardenable metals of differing chemical compositions laminated together by hot rolling and thence hardened and flattened in a single roller leveller operation by quenching while roller levelling to impart different degrees of hardness to the respective lamina.

---

Figure 1:
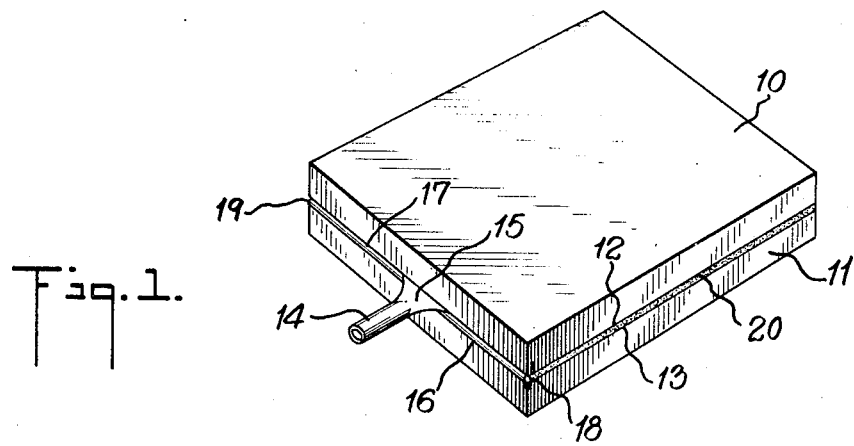

This invention pertains to composite metal articles and the production thereof, and more especially to such as are produced from metal plates of differing chemical compositions, respectively, and such as to be hardenable to differing hardnesses in a single rapid cooling or quenching treatment.

The invention is particularly applicable to the production of dual hardness, composite metal armor plate produced by laminating together, by elevated temperature rolling reduction, a pair of ferrous or other metal plates of chemical compositions such, respectively, as to be quench-hardenable, one to a relatively high hardness, for example, on the order of "C" 60 Rockwell and the other to a lower hardness, for example, on the order of "C" 40–45 Rockwell, whereby one lamina of the resulting composite, will be of sufficient hardness as to resist bullet penetration, while the other lamina of the composite will be of sufficiently lower hardness as to be tough and resistant to shattering of the composite by impact of the bullet.

In accordance with the method of the invention, the ferrous or other metal plates of differing compositions to be laminated together, are preferably surface ground, grit blasted or otherwise processed on one surface of each to remove scale and oxides and to impart substantially planar configuration, and the so processed surfaces are then cleaned to remove surface impurities and are opposed preferably with the interposition along one side of a thin spacing wire to provide space for interposition of an evacuating tube. The thus opposed plates are then welded together about the seam between the opposite surfaces to form a gas-tight joint therebetween. Freon or other gas, such as helium, argon, etc., is then injected through the tube into the space between the plates to check for weld leaks, which, if present, are repaired. An inert purging gas such as argon is then injected through the tube into the space between the plates, and the space is then evacuated by connection of evacuating equipment to the evacuating tube. A "getter" such as a small amount of titanium is also preferably interposed between the plates prior to assembly for residual deoxidation. The evacuating tube is then sealed off and the composite buildup thus formed is heated to a temperature sufficiently high for hot rolling, and is subjected to an initial or breakdown rolling reduction thence in successive passes through a single stand, rolling mill, employing a sufficiently heavy reduction on the first pass, preferably at least 30%, to bond the plates together. The composite thus formed is transferred thence to a roller leveller and hot roller levelled to flatten, during which it is fan-cooled or otherwise cooled fairly rapidly to below the recrystallization temperature, for example below about 700° F. as applied to the compositing of ferrous metal plates.

This initial rolling, which is accomplished at a relatively high temperature, is a critical step of the process, in that it achieves the welding together of the two dissimilar metals. The temperature to which the composite assembly is initially heated prior to this initial rolling, will depend on the grade and composition of the two materials to be bonded, but usually is on the order of 2000–2200° F. The important factor is that a substantial reduction must be achieved on the first pass through the rolling mill if successful bonding is to be obtained.

The composite metal breakdown resulting from this initial rolling is next subjected to a finish rolling operation in which the composite is heated to a temperature sufficiently high to place in solution all precipitated compounds in the material, usually at about 2000–2200° F. It is then transferred to a furnace at lower temperature, usually on the order of about 1400–1500° F., and after the material has reached this lower temperature, it is "warm-cold" rolled to the desired final thickness. The material, as it is thus "warm-cold" rolled, distorts to a considerable degree, assuming a pronounced arcuate shape due to the differing coefficients of thermal expansion of the two different materials from which the composite is produced. This results in a tremendous amount of strain imparted to the composite when it is rolled in the temperature range of 1400–1500° F.

At this stage of the operation, the ability to flatten the material without destroying the properties imparted to the material by rolling, is an important factor of the invention and this is accomplished by thereafter passing the material back and forth in a roller leveller while being water-quenched during the levelling operation. If the material is not flattened at this point and in this manner, it becomes extremely difficult, if not impossible to flatten the material and still maintain the properties that have been imparted to it. The single quenching treatment concurrently hardens the two laminae of the composite to different hardness values, which can be pre-selected according to the differing compositions of the ferrous metal alloys employed, to obtain any desired ratio of hardness values in the composite, as, for example, "C" 60 Rockwell in one lamina and "C" 40–50 in the other.

Figure 2:
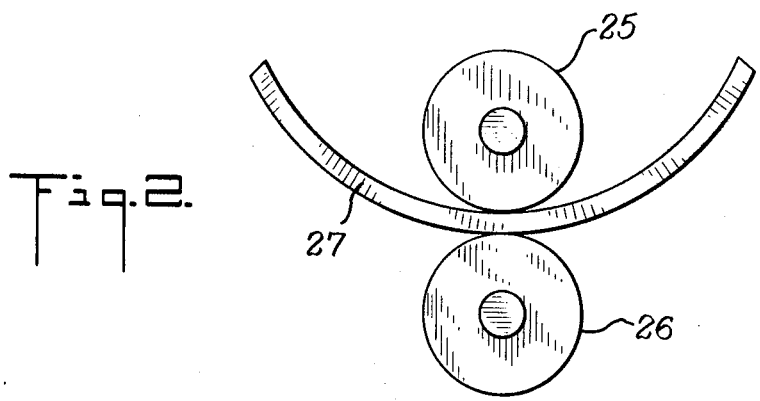
Figure 3:
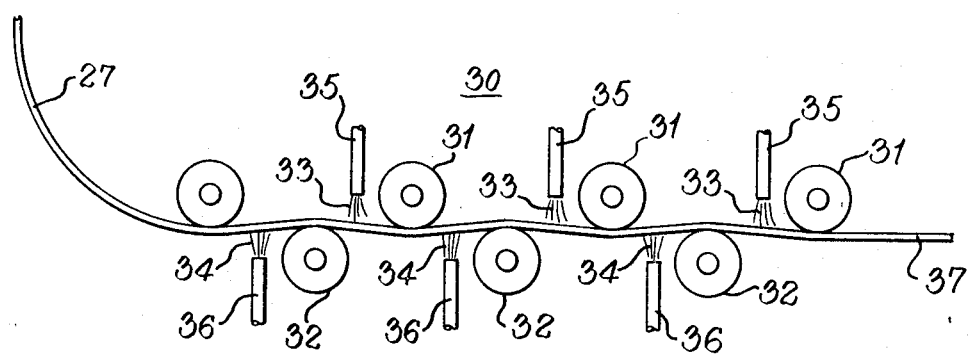

Referring now to the accompanying drawing for more detailed description of the invention: FIG. 1 is a perspective view of the laminate buildup, illustrating the details of assembly preparatory to the initial rolling reduction. FIG. 2 is a diagrammatic showing in end elevation of the finish rolling reduction in a single stand rolling mill of the composite obtained from the initial or breakdown rolling operation. FIG. 3 is a diagrammatic showing in side elevation of the finish rolled composite being passed through a roller leveller with concurrent water quenching to harden.

Referring to FIG. 1, the composite buildup assembly comprises a pair of ferrous or other metal plates 10 and 11 of differing chemical compositions, which prior to assembly as shown, are preferably ground in oil on a surface of each, such as 12 and 13, until free from all defects and until the surfaces have been ground to substantially planar configuration. The so ground surfaces 12 and 13 are then scrubbed with a suitable cleanser, such for example, as that sold under the trade name "Ajax," the cleanser washed therefrom, and the surfaces scrubbed with a suitable detergent, such for example, as that sold under the trade name "Amway." The surfaces are again washed, double-rinsed with distilled water, and thence dried in hot air. The plates 10 and 11 are then assembled one on top of the other, as shown in FIG. 1, with the ground and cleaned surfaces 12 and 13 opposed. A vacuum tube 14 having a flattened end, as at 15, is interposed between the plates on one side thereof, and on each side of this tube are interposed thin spacer wires 16 and 17 extending from the tube flattened portion 15 to the opposed corners, respectively, of the opposed laminates, as at 18 and 19. The assembly is then clamped with C-clamps on all four sides.

The composite thus formed is then placed on a heater and heated to approximately 300° F. and the plates 10 and 11 tack-welded together on all four sides adjacent to clamps. The clamps are then removed and the seam between the two plates welded all around, as at 20. A source of Freon or other gas is then connected to the evacuating tube 14 to check the welded assembly for leaks in the weld, which are repaired as required. A source of inert gas, such as argon, is then connected to the tube 14 to purge the Freon or other gas from between the plates 10 and 11. An evacuating pump is then connected to the tube 14 and the gas pressure between the plates pumped down to one micron or less. The tube 14 is then sealed off before the removal of the evacuating pump connection.

The FIG. 1 assembly is thereupon heated to an appropriate hot rolling temperature, usually on the order of about 2000–2200° F., depending on the composition of the plates 10, 11 and subjected to an initial or breakdown rolling operation, in a single stand mill, to a desired intermediate gauge, employing, as above stated, a sufficiently heavy reduction on the first pass to weld or bond the two plates together, a first pass reduction on the order of about 30% being ordinarily required to accomplish this. The breakdown is thereupon transferred to a roller leveller and hot roller levelled to flatten while concurrently fan-cooling or otherwise rapidly air cooling to a temperature below about 700° F. or below the recrystallization temperature.

The composite is thereupon transferred into a furnace and again heated to about 2000–2200° F. for a period sufficient to heat the material throughout to that temperature, is then transferred to a conveyor and allowed to cool until the temperature drops to approximately 1400° F., is then charged into a second furnace maintained at a slightly higher temperature of about 1450° F., is held there for a period sufficient to obtain temperature equalization. The material is then, referring to FIG. 2, rolled in the two-high mill stand 25, 26 shown therein in successive passes, with the lamina of the composite having the lower coefficient of thermal expansion on top. As a result of this "warm-cold" temperature rolling, the material distorts considerably during the rolling operation and assumes an arcuate shape, such as illustrated at 27. The rolling is continued in successive passes until the composite has been reduced to the desired finish thickness, whereupon it is immediately transferred to the roller leveller illustrated in FIG. 3 and generally designated by the numeral 30. As the composite 27 passes through the leveller rolls between the upper and lower roll stands, as at 31, 32, it is subjected to a quenching treatment by water jet sprays, as at 33, 34 sprayed thereon from above and below by nozzles as at 35, 36. As a result of this leveller rolling and water qquenching action, the plate becomes flattened as at 37 and also quench-hardened with one lamina of the composite quenching to a higher hardness than the other.

Reverting to FIG. 1, for producing a dual hardness armor plate, the lower laminate 10 may for example be made of H–11 steel of the nominal composition 5% chromium, 1.3% molybdenum, 0.5% vanadium, 0.85% manganese, 0.4% silicon, 0.4% carbon. The upper laminate 11 may for example be made of HP 9–4–30 steel of the nominal composition 9% nickel, 4% cobalt, 0.3% carbon. As a result of this choice of these two steels for the respective lamina of the composite, the composited plate 27 quench-hardens in the roller leveller processing to about "C" 60 Rockwell for the H–11 steel lamina and to about "C" 40–45 Rockwell for the HP 9–4–30 steel lamina.

Instead of the combination of H–11 and HP 9–4–30 steel, equivalent or in some respects better properties can be obtained with the combination of H–11 and HP 150 steels, the latter as described in U.S. patent to Shimmin et al., No. 3,254,991. Other materials productive of equivalent or desired properties may of course be employed.

If the composite plate 27 as rolled in FIG. 2 is permitted to cool down to room temperature before attempting to flatten in the roller leveller of FIG. 3, the plate will be so brittle that it will crack up. Also, if plate 27 is flattened in the roller leveller without quenching, and is thereupon reheated to the austenitizing temperature and quenched, it will warp. It is only by simultaneous flattening the plate in the roller leveller and concurrently quenching the same as it is being flattened that a flat plate of the requisite dual hardness is obtained.

EXAMPLE

A composite assembly like that of FIG. 1 is made up consisting of a lower plate of H–11 steel and an upper plate of HP 9–4–30 steel, in thicknesses of about 2" each to provide a composite assembly of about 4" in overall thickness. The composite assembly is then charged into a furnace maintained at 2050–2150° F. and held therein for about 1½ hours total furnace time. It is then transferred to a two-high mill like that shown in FIG. 2, with the H–11 steel side down and subjected to rolling reduction in five passes with an approximately 30% reduction on the initial pass to assure bonding, to produce a breakdown of final gauge of about 1.2" in thickness. The composite is then transferred to a roller leveller, like that illustrated in FIG. 3, and hot roller levelled to flatten with fan-cooling until the temperature drops below about 700° F.

The composite is then charged into a furnace operating at about 1950–2050° F. and held there for about 1½ hours, the furnace atmosphere being held on the reducing side. The composite is then transferred to a conveyor and held until the temperature drops to approximately 1400° F., and is charged into a second furnace operating at about 1450° F. and held therein for about five to fifteen minutes. It is then transferred to the two-high mill illustrated in FIG. 2 and "warm-cold" rolled in five passes to a final thickness of about 0.60", the finishing temperature being approximately 1100° F. or lower. The composite plate is then transferred to the roller leveller of FIG. 3 as quickly as possible, at which time the temperature should be in the range of about 900–1000° F., and subjected to hot roller flattening therein in two passes with water quenching to quench as rapidly as possible below the $M_f$ point of martensitic transformation, while concurrently achieving and maintaining the required degree of flatness. The total time to flatten and reduce the temperature to approximately 200° F. is on the order of about two to three minutes.

The invention is applicable to the compositing of ferrous metal plates of any relative thickness ratio, such as plates of equal thickness or plates one of which has a greater or lesser thickness than the other in any preselected ratio. It is also applicable to the compositing of two, three or more laminates, such, for example, as a laminate assembly consisting of exterior plates of one chemical composition and an interposed plate of another chemical composition, to provide, for example, a composite which on quenching has outer laminae of high hardness and an interposed lamina which is of a lower hardness and is tougher.

In order to assure that the composite upon being subjected to the final roller level flattening and quenching stage will quench to martensite, the ferrous metals selected, must have time-temperature transformation or "TTT" curves which are sufficiently slow in transforming to higher transformation products, such as pearlite, ferrite or bainite, that the final rolling and levelling and quenching operation can be accomplished before transformation into any such higher temperature products occurs. This is true of the H–11 and HP 9–4–30 steels.

What is claimed is:

1. The method of making a composite metal body from plates of quench hardenable metals of differing chemical compositions, which comprises: cleaning surfaces of said plates to be opposed to remove oxides and other surface impurities, opposing said surfaces, welding the opposed plates about the seam into a gas-tight joint and evacuating the space between said surfaces, heating the resulting composite assembly to temperature sufficiently high for hot rolling and rolling in successive passes employing a sufficiently heavy reduction on the first pass to bond said plates together, said rolling imparting distortion to said composite due to differing coefficients of thermal expansion of said plates, subjecting the composite while still at elevated temperature to successive passes through a roller leveller to flatten said composite and concurrently therewith subjecting said composite to a quenching treatment concurrently to harden and continuing the passes therein until said composite is reduced substantially to ambient temperature.

2. The method according to claim 1 wherein said composite is subjected to a reduction of at least 30% on the first pass through said two-high mill.

3. A method according to claim 1 wherein said metal plates are respectively of chemical compositions such as to be quench-hardenable to different hardnesses during said roller leveller flattening and quenching treatment.

4. The method according to claim 3 wherein the chemical compositions of said metal plates are such that said roller leveller flattening and quenching treatment hardens one plate of said composite to approximately 60 Rockwell "C" and the other plate to approximately 40–45 Rockwell "C."

5. The method according to claim 1 wherein said rolling is effected in two stages comprising an initial stage wherein said composite assembly is hot rolled to an intermediate gauge, is thereupon roller leveller flattened with an air cool, is thereupon heated to temperature sufficiently high for solution treating, is thereupon cooled to about 1400–1500° F. and "warm-cold" rolled thence to final gauge and thereupon roller leveller flattened with concurrent water quenching.

6. The method of making a composite metal body from metal plates made of quench hardenable metals of differing chemical compositions, which comprises: cleaning surfaces of said plates to be opposed to remove oxides and other surface impurities, opposing said surfaces, welding the opposed plates about the seam into a gas-tight joint and evacuating the space between such surfaces, heating the resulting composite assembly to temperature sufficiently high for hot rolling, and subjecting to a first rolling reduction in successive passes, employing a sufficiently heavy reduction on the first pass to bond said plates together and until the resulting composite is reduced to an intermediate gauge, thereupon roller leveller flattening with air-cooling, reheating the composite to temperature sufficiently high to solution treat said composite, cooling thence to about 1400–1500° F. and subjecting to a second rolling reduction to final gauge by successive passes between a pair of opposed rolls, immediately thereafter subjecting said composite to roller leveller flattening while concurrently subjecting said composite to a quenching treatment, thereby to flatten and harden said composite.

7. The method according to claim 6 wherein said composite assembly is subjected to a reduction of at least 30% on the initial pass of said first rolling reduction.

8. The method according to claim 6 wherein said metal plates are of chemical composition such as to be quench-hardenable to different hardnesses, respectively, during said roller leveller flattening and quenching treatment.

9. The method according to claim 8 wherein the chemical compositions of said metal plates are such that said roller leveller flattening and quenching treatment, hardens one plate of said composite to approximately 60 Rockwell "C" and the other plate to approximately 40–45 Rockwell "C."

10. The method according to claim 6 wherein said composite assembly is heated to about 2000–2200° F. prior to said first rolling reduction, and wherein the said composite is heated to about 2000–2200° F. prior to said second rolling reduction and is cooled thence to about 1400–1500° F. prior to said second rolling reduction.

References Cited

UNITED STATES PATENTS

| 2,438,728 | 3/1948 | Liebowitz | 148—34 |
| 2,474,682 | 6/1949 | Liebowitz | 148—34 |
| 2,783,788 | 3/1957 | Ungerer | 148—151 |
| 2,820,751 | 1/1958 | Saller | 176—67 |
| 3,091,847 | 6/1963 | Peters | 176—67 |

L. DEWAYNE RUTLEDGE, Primary Examiner

W. W. STALLARD, Assistant Examiner

U.S. Cl. X.R.

148—34, 143, 156